(12) United States Patent
Kim et al.

(10) Patent No.: US 9,946,451 B2
(45) Date of Patent: Apr. 17, 2018

(54) TERMINAL AND METHOD OF OPERATING THE SAME

(71) Applicant: LG ELECTRONICS INC., Seoul (KR)

(72) Inventors: Jaewoon Kim, Seoul (KR); Dongwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 504 days.

(21) Appl. No.: 14/381,143

(22) PCT Filed: Mar. 12, 2013

(86) PCT No.: PCT/IB2013/000905
§ 371 (c)(1),
(2) Date: Aug. 26, 2014

(87) PCT Pub. No.: WO2014/140666
PCT Pub. Date: Sep. 18, 2014

(65) Prior Publication Data
US 2016/0048284 A1    Feb. 18, 2016

(51) Int. Cl.
G06F 3/0486 (2013.01)
G06F 3/0488 (2013.01)
G06F 9/54 (2006.01)
G06F 3/0481 (2013.01)
G06F 3/0482 (2013.01)
G06F 3/048 (2013.01)

(52) U.S. Cl.
CPC .......... G06F 3/0486 (2013.01); G06F 3/0482 (2013.01); G06F 3/0488 (2013.01); G06F 3/04817 (2013.01); G06F 3/04883 (2013.01); G06F 9/543 (2013.01)

(58) Field of Classification Search
CPC .. G06F 3/0486; G06F 3/04883; G06F 3/0482; G06F 3/04817; G06F 3/0488; G06F 9/543; G06F 3/04842
See application file for complete search history.

(56) References Cited

U.S. PATENT DOCUMENTS 5,530,865 A *  6/1996  Owens .................. G06F 9/4443
                                              715/203
6,874,130 B1 *  3/2005  Baweja ............. G06F 17/30067
                                              707/E17.01

(Continued)

FOREIGN PATENT DOCUMENTS

KR   10-2010-0054944 A   5/2010
KR   10-2012-0062297 A   6/2012

*Primary Examiner* — Jeanette J Parker
(74) *Attorney, Agent, or Firm* — Birch, Stewart, Kolasch & Birch, LLP

(57) ABSTRACT

Provided are a terminal and a method of operating the same. The terminal includes a display unit displaying a plurality of icons that respectively represent the plurality of objects and detecting a user input; and a control unit displaying the plurality of icons on the display unit according to a first user input, displaying at least one icon to be identified according to a second user input that selects the at least one icon selected from the plurality of icons, and pasting an object corresponding to the selected icon on an input window according to a third user input that inputs the selected at least one icon into the input window.

20 Claims, 15 Drawing Sheets

(56) References Cited

U.S. PATENT DOCUMENTS

| | | | |
|---|---|---|---|
| 7,398,313 B1* | 7/2008 | Inagaki | G06F 9/466 709/203 |
| 8,677,083 B1* | 3/2014 | McHugh | G06F 11/1435 711/100 |
| 2004/0056896 A1 | 3/2004 | Doblmayr et al. | |
| 2004/0070621 A1* | 4/2004 | Suzuki | G10H 1/0008 715/764 |
| 2005/0289476 A1* | 12/2005 | Tokkonen | G06F 3/038 715/769 |
| 2008/0307324 A1* | 12/2008 | Westen | G06F 3/0486 715/753 |
| 2010/0017734 A1 | 1/2010 | Cummins et al. | |
| 2010/0251153 A1* | 9/2010 | SanGiovanni | G06F 3/04817 715/767 |
| 2011/0037714 A1* | 2/2011 | Seo | G06F 3/0482 345/173 |
| 2012/0005608 A1 | 1/2012 | Wong et al. | |
| 2012/0081317 A1 | 4/2012 | Sirpal et al. | |
| 2012/0144293 A1 | 6/2012 | Kim | |
| 2012/0246594 A1* | 9/2012 | Han | G06F 3/0486 715/790 |
| 2013/0104054 A1* | 4/2013 | Cao | G06F 3/038 715/753 |
| 2013/0321340 A1* | 12/2013 | Seo | G06F 1/1641 345/174 |
| 2014/0157169 A1* | 6/2014 | Kikin-gil | G06F 9/543 715/770 |

\* cited by examiner

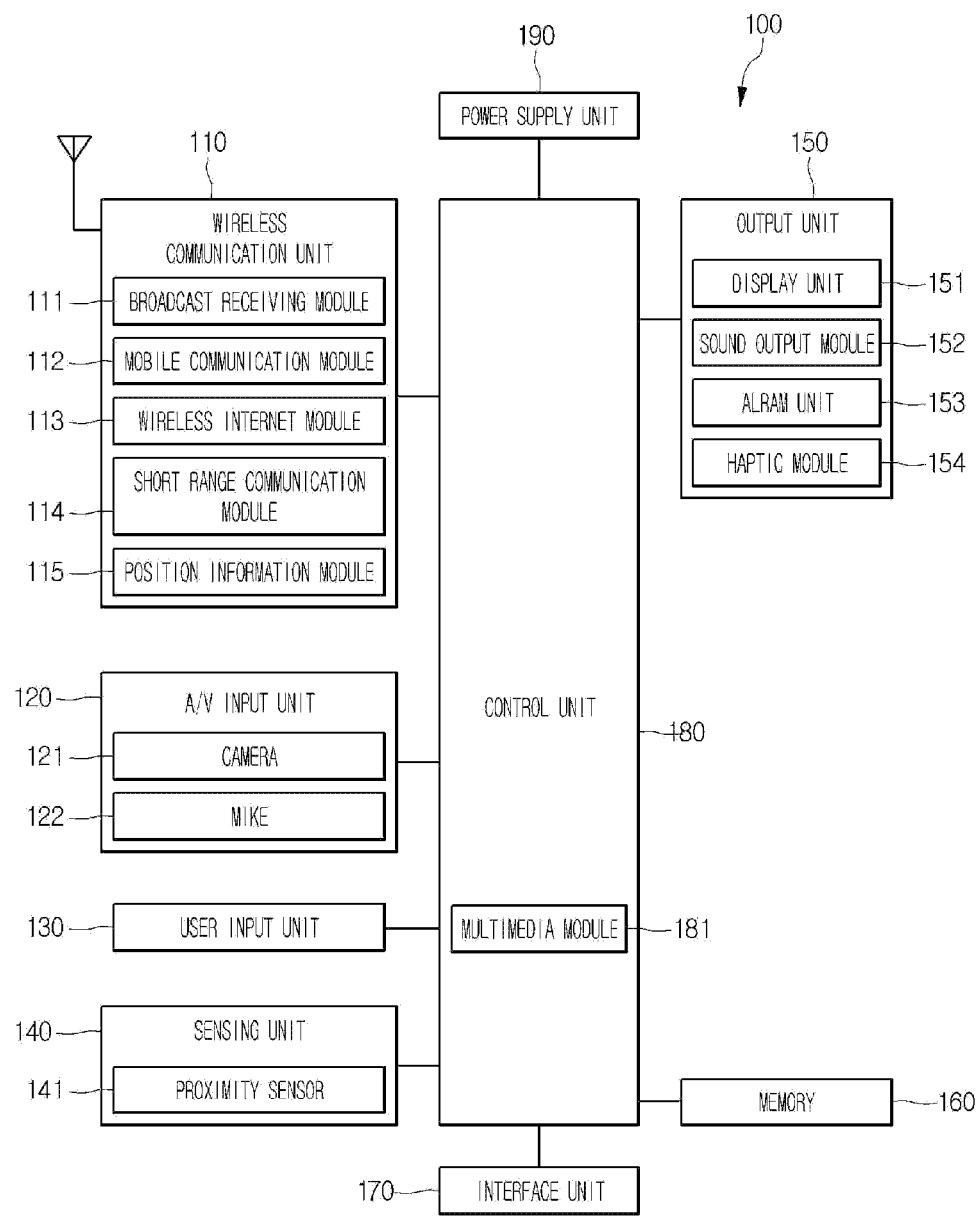

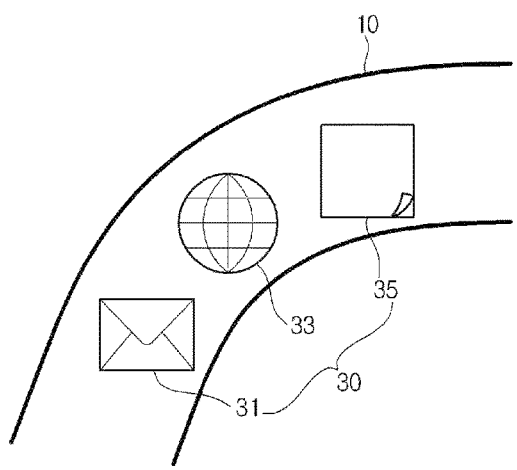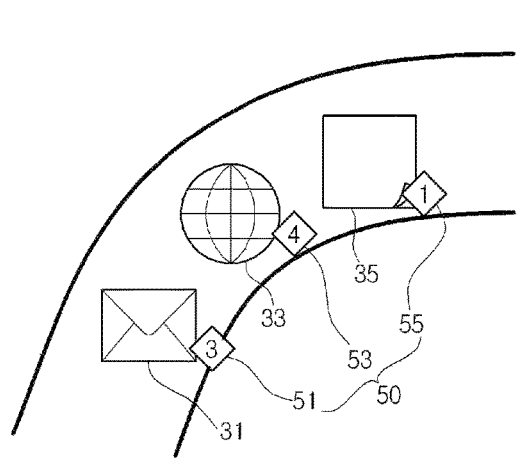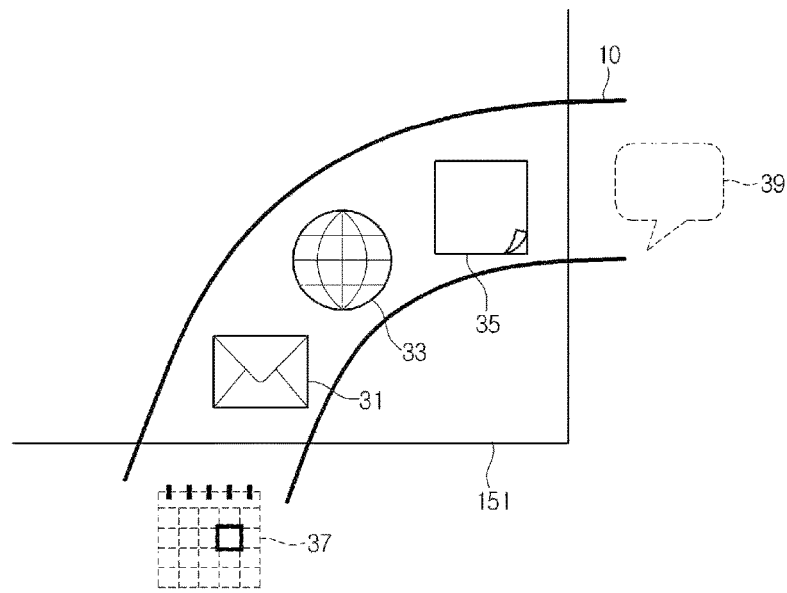

FIG.16
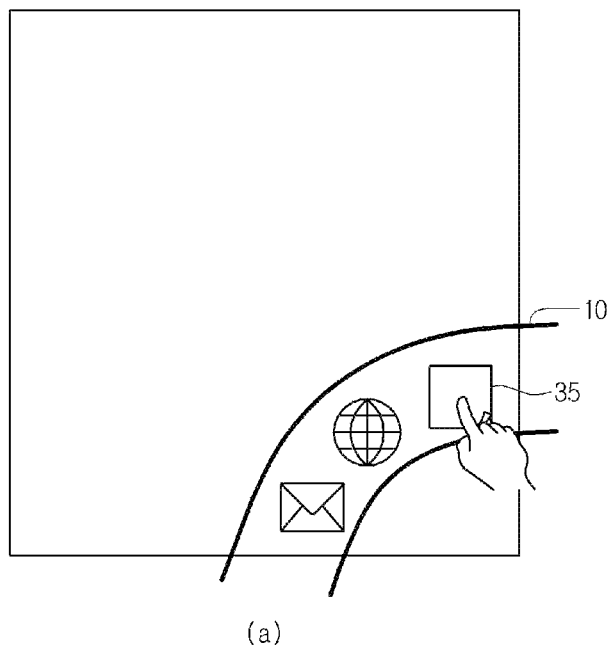
(a)
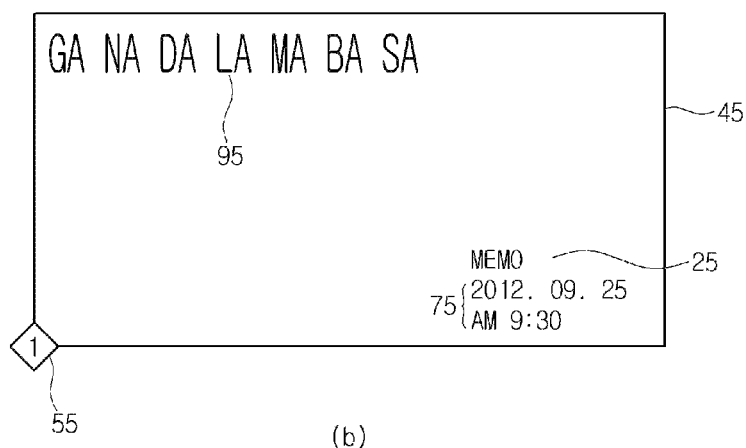
(b)
FIG.17
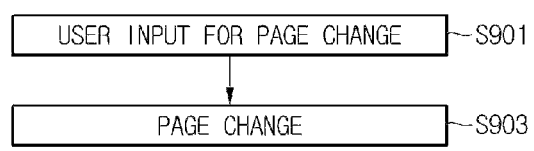

TERMINAL AND METHOD OF OPERATING THE SAME

BACKGROUND

The present disclosure relates to a terminal and a method of operating the same, and more particularly, to a method of copying and pasting a plurality of objects.

Terminals may be classified into mobile/portable terminals and stationary terminals according to portability. Then, the portable terminals may be classified into handheld terminals and vehicle mount terminals according to whether users can carry terminals directly.

As such terminals are becoming diversified in functions, they are realized in the forms of multimedia players having complex functions for capturing pictures or videos, playing music or movie files, playing games, receiving broadcastings, or viewing news or magazine articles.

Thus, as terminals are becoming realized in the forms of multimedia players, a user may need to select sections of texts from text media such as news or magazine articles and then copy the selected sections to paste them on another application.

Terminals having touch screens according to related art embodiments provide object selecting, copying and pasting functions through touch input. For example, when the text on a touch screen is touched long, or an arrow displayed at the start position and end position of a long-touched word is touched and dragged, the text at the touched position is selected. Then, after the selected text is copied and then a displayed input window is touched long, the copied text is pasted on the input window.

However, after a plurality of text selections and copies are performed, if a user long-touches an input window displayed on a screen, a terminal may paste only the most recently selected and copied text. Therefore, targets that can be copied and pasted are limited thereby causing inconveniences.

SUMMARY

Embodiments provide a terminal selecting and pasting one of a plurality of copied objects.

Embodiments also provide a terminal copying and storing a plurality of objects, the terminal including: a display unit displaying a plurality of icons that respectively represent the plurality of objects and detecting a user input; and a control unit displaying the plurality of icons on the display unit according to a first user input, displaying at least one icon to be identified according to a second user input that selects the at least one icon selected from the plurality of icons, and pasting an object corresponding to the selected icon on an input window according to a third user input that inputs the selected at least one icon into the input window.

The first user input may be detected from an edge area of the display unit.

The first user input may include a touch and drag detected in a direction from the edge area of the display unit to the center of the display unit.

The control unit may display a shape of each of the plurality of icons as an application from which each of the plurality of objects is copied.

The control unit may display each of the plurality of icons together with an object number representing an order in which each of the plurality of objects is copied.

The control unit sequentially may display each of the plurality of icons according to the object number.

The control unit may display the plurality of icons sequentially in a bar-shaped viewer area.

The viewer area may include an activation area displayed on the display unit and an inactivation area not displayed on the display unit.

The control unit may display a date and time at which each of the plurality of objects is copied, in an icon area of each of the plurality of icons.

The control unit may display an entire or part of contents of each of the plurality of objects, in an icon area of each of the plurality of icons.

The display unit may detect a fifth user input detected in a direction toward an edge area; the control unit stops displaying the plurality of icons according to the fifth user input; and the fifth user input includes a touch and drag.

In correspondence to a sixth user input that selects at least one icon from the plurality of icons, the control unit may display on the display unit information relating to an object that the selected at least one icon represents; and the sixth user input may correspond to a user input distinguished from the second user input.

The object related information may include at least one of contents of the object, identification information on an application from which the object is copied, a date and time at which the object is copied, or an order in which the object is copied.

The control unit may display information relating to an object that an unselected icon represents, in addition to the at least one icon selected by the sixth user input, according to a seventh user input.

The control unit may display on the display unit the object related information and an editing tool for modifying or deleting the object related information, and may modify or delete the object related information according to an eighth user input that selects the editing tool.

The control unit may further display on the display unit an indicator representing an original position where the object is copied, and displays a screen including an original from which the object is copied according to a ninth user input that selects the indicator.

The control unit may delete some of the plurality of objects when the total number of the copied objects exceeds the number of copy available objects or a storage time of the copied object exceeds a reference time.

In another embodiment, provided is a method of operating a terminal including a display unit displaying a plurality of icons that respectively represent a plurality of objects and a control unit copying and storing the plurality of objects. The method includes: sequentially displaying the plurality of icons in a bar shaped viewer area according to a first user input; displaying at least one icon to be identified according to a second user input that selects the at least one icon selected from the plurality of icons; and pasting an object corresponding to the selected at least one icon on an input window according to a third user input that inputs the selected at least one icon into the input window.

The viewer area may include an activation area displayed on the display unit and an inactivation area not displayed on the display unit, and the method may further include: moving a first icon in the activation area to the inactivation area according to a fourth user input; and moving a second icon in the inactivation area to the activation area in correspondence to the fourth user input.

The method may further include stopping displaying the plurality of icons according to a fifth user input, wherein the fifth user input includes a touch and drag that is detected in a direction toward an edge area of the terminal.

The details of one or more embodiments are set forth in the accompanying drawings and the description below. Other features will be apparent from the description and drawings, and from the claims.

BRIEF DESCRIPTION OF THE DRAWINGS

FIG. 1 is a block diagram of a mobile terminal according to an embodiment of the present invention.

FIG. 2 is a view illustrating multiple mode display components according to an embodiment of the present invention.

FIG. 3 is a view illustrating multiple mode display components according to another embodiment of the present invention.

FIG. 4 is a view illustrating multiple mode display components according to another embodiment of the present invention.

FIG. 16 is a view illustrating a preview execution command and preview screen of copied objects in a multiple mode according to an embodiment of the present invention.

FIG. 17 is a flowchart illustrating a method of changing a preview screen of a multiple mode according to an embodiment of the present invention.

DETAILED DESCRIPTION OF THE EMBODIMENTS

Figure 5:
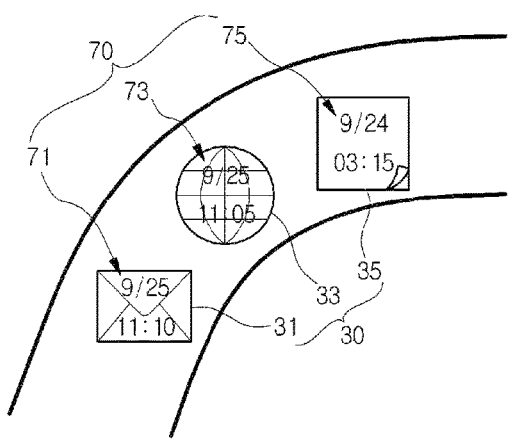
FIG. 5 is a view illustrating multiple mode display components according to another embodiment of the present invention.

Hereinafter, embodiments of the present invention will be described in more detail with reference to the accompanying drawings. The suffixes "module" and "unit" for components, which are used in the description below, are assigned and mixed in consideration of only the easiness in writing the specification. That is, the suffixes do not have different meanings or roles.

Mobile terminals described in this specification may include smart phones, laptop computers, digital broadcasting terminals, personal digital assistants, portable multimedia players, and navigation systems. However, it is apparent to those skilled in the art that configurations according to embodiments described in this specification may be applicable to stationary terminals such as digital TVs, desktop computers, etc. in addition to the mobile computers.

Then, a structure of a mobile terminal according to an embodiment of the present invention will be described with reference to FIG. 1.

FIG. 1 is a block diagram of a mobile terminal according to an embodiment of the present invention.

The mobile terminal 100 may include a wireless communication unit 110, an audio/video (A/V) input unit 120, a user input unit 130, a sensing unit 140, an output unit 150, a memory 160, an interface unit 170, a control unit 180, and a power supply unit 190. Since the components shown in FIG. 1 are not indispensable, a mobile terminal having more or less components may be realized.

Hereinafter, the components will be described one by one.

The wireless communication unit 110 may include at least one module for allowing wireless communication between the mobile terminal 100 and a wireless communication system or between the mobile terminal 100 and a network having the mobile terminal 100. For example, the wireless communication unit 110 may include a broadcasting receiving module 111, a mobile communication module 112, a wireless internet module 113, a short-range communication module 114, and a position information module 115.

The broadcasting receiving module 111 receives a broadcast signal and/or broadcast related information from an external broadcast management server through a broadcast channel.

The broadcast channel may include a satellite channel and a terrestrial channel. The broadcast management server may mean a server that generates and transmits a broadcast signal and/or broadcast related information or a server that receives a pre-generated broadcast signal and/or broadcast related information and transmits it to a terminal. The broadcast signal may include a TV broadcast signal or a combined broadcast signal of a TV or radio broadcast signal and a data broadcast signal, in addition to a TV broadcast signal, a radio broadcast signal, and a data broadcast signal.

The broadcast related information may include information relating to a broadcast channel, a broadcast program, or a broadcast service provider. The broadcast related information may be provided through a mobile communication network. In this case, the broadcast related information may be received by the mobile communication module 112.

The broadcast related information may be in various formats. For example, the broadcast related information may include formats such as Electronic Program Guide (EPG) of Digital Multimedia Broadcasting (DMB) and Electronic Service Guide (ESG) of Digital Video Broadcast-Handheld (DVB-H).

The broadcast receiving module 111 may receive a digital broadcast signal by using digital broadcasting system such as Digital Multimedia Broadcasting-Terrestrial (DMB-T), Digital Multimedia Broadcasting-Satellite (DMB-S), Media Forward Link Only (MediaFLO), and Digital Video Broadcast-Handheld (DVB-H), Integrated Services Digital Broadcast-Terrestrial (ISDB-T). Of course, the broadcast receiving module 111 may be configured to fit other broadcasting systems in addition to the above-mentioned digital broadcasting system.

Broadcast signals and/or broadcast related information received through the broadcast receiving module 111 may be stored in the memory 160.

The mobile communication module 112 transmits/receives a wireless signal to/from at least one of a base station, an external terminal, and server on a mobile communication network. The wireless signal may include various formats of data according to transmissions of voice call signals, video call signals or text/multimedia message messages.

The wireless internet module 113, as a module for wireless internet access, may be internally or externally mounted on the mobile terminal 100. A wireless internet technique may include Wireless LAN (WLAN), Wireless Fidelity (Wi-Fi), Wireless broadband (Wibro), World Interoperability for Microwave Access (Wimax), and High Speed Downlink Packet Access (HSDPA).

The short-range communication module 114 means a module for short-range communication. A short range communication technique may include Bluetooth, Radio Frequency Identification (RFID), infrared Data Association (IrDA), Ultra Wideband (UWB), and ZigBee.

The position information module 115 is a module for obtaining the position of the mobile terminal 100, and its representative example includes a global position system (GPS).

Referring to FIG. 1, the A/V input unit 120 is to input audio signals or video signals, and may include a camera 121 and a mike 122. The camera 121 processes picture frames such as still images or videos obtained by an image sensor in a video call mode or a capture mode. The processed image frames may be displayed on a display unit 151.

The picture frames processed in the camera 121 may be stored in the memory 160 or may be transmitted to the outside through the wireless communication unit 110. The camera 121 may be provided two according to a usage environment.

The mike 122 receives external audio signals through a microphone in a call mode, a recording mode, or a voice recognizing mode, and then processes the received signals as electrical audio data. In the case of a call mode, the processed voice data are converted into transmittable formats and outputted to a mobile communication base station through the mobile communication module 112. The mike 122 may have various noise cancelling algorithms to remove noise occurring when external audio signals are received.

A user generates input data for controlling an operation of a terminal through the user input unit 130. The user input unit 130 may include a key pad, a dome switch, a touch pad (resistive/capacitive), a jog wheel, and a jog switch.

The sensing unit 140 senses current states of the mobile terminal 100 such as the open/close state of the mobile terminal 100, the position of the mobile terminal 100, user contacts, the orientation of the mobile terminal 100, and the acceleration/deceleration of the mobile terminal 100, so as to generate a sensing signal for controlling an operation of the mobile terminal 100. For example, when the mobile terminal 100 is a slide phone, it may sense whether the slide phone is opened or closed. Additionally, the sensing unit 140 may sense whether the power supply unit 190 supplies power or whether the interface unit 170 is connected to an external device. Accordingly, the sensing unit 140 may include a proximity sensor 141.

The output unit 150 generates visual, auditory, or tactile outputs and may include a display unit 151, a sound output module 152, an alarm unit 153, and a haptic module 154.

The display unit 151 displays (outputs) information processed in the mobile terminal 100. For example, in the case of call mode, the mobile terminal 100 displays a user interface (UI) or a graphic user interface (GUI) relating to a call. In the case of a video call mode or a capture mode, the mobile terminal 100 displays a captured or/and received image, UI or GUI.

The display unit 151 may include at least one of liquid crystal display (LCD), thin film transistor-liquid crystal display (TFT LCD), organic light-emitting diode (OLED), a flexible display, and a 3D display.

Some displays may be configured with a transparent type or a light transmissive type to see the outside through them. Those may be called a transparent display, and their example includes transparent OLED (TOLED). The rear structure of the display unit 151 may be also configured with a light transmissive structure. By such a structure, a user may see an object at the rear of a terminal body through an area that the display unit 151 of the terminal body occupies.

There may be at least two display unit 151 according to the implementation type of the mobile terminal 100. For example, the mobile terminal 100 may include a plurality of display units, which are disposed at one surface, being spaced apart from each other or integrally or disposed at different surfaces.

When the display unit 151 and a sensor for sensing a touch operation (hereinafter, referred to as a touch sensor) constitute a mutual layer structure (hereinafter, referred to as a touch screen), the display unit 151 may be used as an input device in addition to an output device. The touch sensor may have forms of a touch film, a touch sheet, and a touch pad.

The touch sensor may be configured to convert a pressure applied to a specific portion of the display unit 151 or a change in capacitance occurring at a specific portion of the display unit 151 into an electrical input signal. The touch sensor may be configured to sense a touched position and area in addition to a pressure when being touched.

When there is a touch input for the touch sensor, signals corresponding thereto are transmitted to a touch controller. The touch control unit processes the signals and then transmits corresponding data to the control unit 180. By doing so, the control unit 180 determines which area of the display unit 151 is touched.

Referring to FIG. 1, a proximity sensor 141 may be disposed in the inner area of the mobile terminal 100 surrounded by the touch screen or near the touch screen. The proximity sensor 141 means a sensor for detecting an object that approaches a predetermined detection surface or an object that is near the proximity sensor 141 by using electromagnetic force or infrared, without mechanical contact. The proximity sensor 141 has a longer lifecycle and higher availability than a contact type sensor.

Examples of the proximity sensor 141 may include a transmissive photoelectric sensor, a direct reflective photoelectric sensor, a mirror reflective photoelectric sensor, a high frequency oscillation proximity sensor, a capacitive proximity sensor, a magnetic proximity sensor, and an infrared proximity sensor. When the touch screen is capacitive, it is configured to detect the proximity of the pointer by using an electric field change according to the proximity of the pointer. In this case, the touch screen (or touch sensor) may be classified as the proximity sensor 141.

Hereinafter, for convenience of description, an action recognizing that a pointer is positioned on the touch screen when the pointer does not contact but is close to the touch screen is referred to as proximity touch, and an action that a pointer actually contacts the touch screen is referred to as contact touch. The position where a pointer makes proximity touch on the touch screen means the position where the pointer is vertical to the touch screen when the pointer makes proximity touch.

The proximity sensor 141 detects proximity touch and proximity touch patterns (such as proximity touch distance, proximity touch direction, proximity touch speed, proximity touch time, proximity touch position, and proximity touch moving state). Information corresponding to the detected proximity touch operation and proximity touch pattern may be displayed on a touch screen.

The sound output module 152 may receive data from the wireless communication unit 110 or may output audio data stored in the memory 160 in a call signal receiving mode, a call mode, a recording mode, a voice recognizing mode, and a broadcast receiving mode. The sound outputting module 152 may output sound signals relating to functions performed in the mobile terminal 100 (for example, call signal reception sound or message reception sound). The sound outputting module 152 may include a receiver, a speaker, and a buzzer.

The alarm unit 153 outputs signals for notifying event occurrence of the mobile terminal 100. Examples of an event occurring in the mobile terminal 100 includes call signal reception, message reception, key signal input, and touch input. The alarm unit 153 may output signals for notifying event occurrence in another format other than a video signal or an audio signal, for example, vibration. The video signal or audio signal may be outputted through the display unit 151 or the sound outing module 152, so that they 151 and 152 may be classified as part of the alarm unit 153.

The haptic module 154 may generate various haptic effects that a user can feel. A representative example of the haptic effect that the haptic module 154 generates includes vibration. The intensity and pattern of vibration that the haptic module 154 generates may be controllable. For example, different vibrations may be synthesized for output or may be sequentially outputted.

The haptic module 154 may generate various haptic effects obtained by arrangement of pins vertically moving with respect to the contact skin, injection power or suction power of air through a nozzle or an intake, grazes on the skin, electrode contact, stimulation of electrostatic force, and cold/warm sense reproduction using a device for suctioning or emitting heat.

The haptic module 154 may deliver haptic effects through direct contact and also may allow a user to feel haptic effects through muscle senses of fingers or arms. There may be at least two haptic modules 154 according to a configuration aspect of the mobile terminal 100.

The memory 160 may store programs for an operation of the control unit 180 and also may temporarily store input/output data (for example, phone books, messages, still images, and videos). The memory 160 may store data relating to vibrations and sounds of various patterns outputted when the touch screen is touched for input.

The memory 160 may include at least one of flash memory type memory, hard disk type memory, multimedia card micro type memory, card type memory (for example, SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. The mobile terminal 100 may operate in linkage with a web storage performing a storage function of the memory 160 on internet.

The interface unit 170 servers as a path to all external devices connected to the mobile terminal 100. The interface unit 170 receives data from external devices, supplies power to each component of the mobile terminal 100, or transmits data in the mobile terminal 100 to external devices. For example, the interface unit 170 may include a wire/wireless headset port, an external charger port, a wire/wireless data port, a memory card port, a port connecting devices equipped with an identification module, an audio I/O port, a video I/O port, and an earphone port.

The identification module, as a chip for storing a variety of information to authenticate the use permission of the mobile terminal 10, may include a User Identify Module (UIM), a Subscriber Identity Module (SIM), and a Universal Subscriber Identity Module (USIM). A device including the identification module (hereinafter, referred to as an identification device) may be manufactured with a smart card type. Accordingly, the identification device may be connected to the mobile terminal 100 through a port.

When the mobile terminal 100 is connected to an external cradle, the interface unit 170 may become a path through which a power from the cradle is supplied to the mobile terminal 100, or a path through which various command signal inputted from the cradle by a user are delivered to the mobile terminal 100. The various command signals or power inputted from the cradle may operate as a signal for recognizing that the mobile terminal 100 is accurately mounted on the cradle.

The control unit 180 controls overall operations of the mobile terminal 100 in general. For example, the control unit 180 performs controls and processes related to a voice call, data communication, and a video call. The control unit 180 may include a multimedia module 181 for playing multimedia. The multimedia module 181 may be provided in the control unit 180, or may be provided separated from the control unit 180.

The control unit 180 may perform a pattern recognition process to recognize writing input or drawing input on the touch screen as characters and images, respectively.

The power supply unit 190 receives external power or internal power in response to a control of the control unit 180 and supplies a power necessary for an operation of each component.

Various embodiments described herein may be realized in a computer or similar device readable recording medium by using software, hardware, or a combination thereof.

According to hardware implementation, embodiments described herein may be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions. In some cases, such embodiments may be realized by the control unit 180.

According to software implementation, embodiments relating to procedures or functions may be realized with an additional software module for performing at least one function or operation. Software codes may be realized by a software application written by an appropriate program language. The software codes may be stored in the memory 160 and executed by the control unit 180.

Next, referring to FIGS. 2 to 6, components displayed on a mobile terminal during multiple mode execution according to an embodiment of the present invention will be described.

FIG. 2 is a view illustrating multiple mode display components according to an embodiment of the present invention.

Referring to FIG. 2, the multiple mode display components include a viewer area 10 and icons 30.

The multiple mode of the mobile terminal 100 according to an embodiment of the present invention may mean a mode in which a plurality of sequentially copied and stored objects are provided simultaneously. An object may include text such as uniform resource locator (URL) and an image, but is not limited thereto.

The viewer area 10 may mean an area where information relating to a plurality of copied and stored objects are displayed. The viewer area 10 may have a straight or curved bar shape, but is not limited thereto. The viewer area 10 may be displayed on a part of the display unit 151, and as shown in FIG. 2, may be displayed diagonally at the edge of the display unit 151.

The icon 30 may include at least one icon 31, 33, and 35, and a plurality of icons may represent a plurality of copied and stored objects, respectively. The shape of the icon 30 may represent a corresponding object of a copied application. For example, the first icon 31 may represent an object copied from a short message service (SMS) application; the second icon 33 may represent an object coped from an internet explorer application; and the third icon 35 may represent an object copied from a memo application.

In such a manner, according to an embodiment, a list of a plurality of copied objects may be provided, so that a user may select and paste a desired object after a plurality of objects are copied and stored.

FIG. 3 is a view illustrating multiple mode display components according to another embodiment of the present invention.

Referring to FIG. 3, the multiple mode display components according to another embodiment of the present invention further includes an object number 50.

The object number 50 may be displayed on areas adjoining to the icon 30. For example, as shown in FIG. 3, the first object number 51 may be displayed at the bottom of the right edge of the first icon 31. Also, although not shown in the drawings, the object number 50 may be displayed overlapping the icon 30. At this point, the whole or part of the object number 50 may be displayed overlapping the icon 30, but is not limited thereto.

The object number 50 may be displayed in a predetermined shape of a figure. For example, as shown in FIG. 3, each of the first object number 51, the second object number 53, and the third object number 55 may be displayed in a rectangle. Also, although not shown in the drawings, each of the first object number 51, the second object number 53, and the third object number 55 may be displayed in different shapes, respectively. Also, although not shown in the drawings, each of the first object number 51, the second object number 53, and the third object number 55 may be displayed with a number.

The object number 50, as a kind of object related information, may mean an order in which a corresponding object among the entire objects is copied or stored.

For example, the object number 50 of the lowest number may mean the most recently copied and stored object. In FIG. 3, the third object number 55 may mean that an object that the third icon 35 represents is the most recently copied object. Additionally, the first object number 51 may mean that an object that the first icon 31 represents is copied thirdly on the basis of the most recent, and the second object number 53 means that an object that the second icon 53 represents is copied earlier than an object that the first icon 31 represents.

According to another embodiment, the object 50 of the lowest number may mean the earliest copied and stored object. In FIG. 3, the third object number 55 may mean that an object that the third icon 35 represents is the earliest copied and stored object. Additionally, the first object number 51 may mean that an object that the first icon 31 represents is copied thirdly on the basis of the most recent, and the second object number 53 means that an object that the second icon 53 represents is copied earlier than an object that the first icon 31 represents.

Or, the object number 50 may mean an order in which a corresponding object is copied or stored among objects copied from the same application. For example, the third object number 55 may mean the most recently copied and stored object among objects copied from a memo application. Or, the third object number 55 may mean the earliest copied and stored object among objects copied from a memo application.

Each of the icons 31, 33, and 35 displayed on the viewer area 10 may be displayed according to an order that the object number 50 indicates, and is not limited thereto.

FIG. 4 is a view illustrating multiple mode display components according to another embodiment of the present invention.

Referring to FIG. 4, the viewer area 10 may include an activation area having activated icons 31, 33, and 35 and an inactivation area having deactivated icons 37 and 39. The activation area of the viewer area 10 may be displayed on the display unit 151, and the inactivation area may not be displayed on the display unit 151.

The number of icons included in the activation and inactivation areas may vary according to a user input but is not limited thereto. For example, a part of a plurality of currently generated icons may be included in the activation area, and the remaining may be included in the inactivation area. Or, although not shown in the drawings, the activation area may include all of currently generated icons.

Additionally, an area where icons are included may vary according to a user input but is not limited thereto. For example, the deactivated icons 37 and 39 in the inactivation area may be displayed on the display unit 151 corresponding to the activation area according to a user input. A change of an area where icons are included will be described in more detail with reference to FIGS. 13 and 14.

FIG. 5 is a view illustrating multiple mode display components according to another embodiment of the present invention.

Referring to FIG. 5, information 70 on the date and time at which an object is copied may be displayed on the inside of the icon 30. For example, information 71 representing the date and time at which an object is copied and stored, i.e. 11:10 9/25, may be displayed on the inside area of the first icon 31. In the same manner, information 73 representing the date and time at which an object is copied and stored, i.e. 11:05 9/25, may be displayed on the inside area of the second icon 33, and information 75 representing the date and time at which an object is copied and stored, i.e. 03:15 9/24, may be displayed on the inside area of the third icon 35.

At this point, the information 70 on the date and time at which an object is copied may include at least one of a time and a date at which an object is copied, and the object copied date may include at least one of day, month, and year, but is not limited thereto. Also, although not shown in the drawings, the information 70 on the date and time at which an object is copied may be displayed on an area adjoining to the icon 30.

At this point, each of the icons 31, 33, and 35 to be displayed on the viewer area 10 may be displayed according to a date and time order in which an object is copied and stored.

Figure 6:
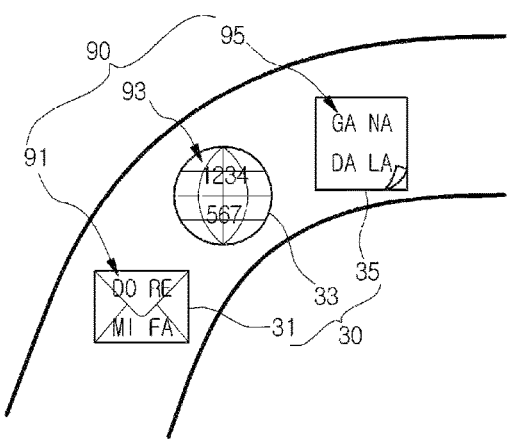
FIG. 6 is a view illustrating multiple mode display components according to another embodiment of the present invention.

FIG. 6 is a view illustrating multiple mode display components according to another embodiment of the present invention.

Referring to FIG. 6, contents of an object 90 may be displayed on the inside of the icon 30. At this point, a part of the contents 90 of the object 90 may be displayed. For example, the first word "do, re, mi, fa" of an object that the first icon 31 represents may be displayed on the inside area of the first icon 31. In the same manner, the first word "1234567" of an object that the second icon 33 represents may be displayed on the inside area of the second icon 33, and the first word "ga, na, da, ra" of an object that the third icon 35 represents may be displayed on the inside area of the third icon 35.

Additionally, if an object is an image, a part of the image may be displayed, and the whole or part of URL, a position where an image is stored, may be displayed, but is not limited thereto. Also, although not shown in the drawings, the contents 90 of an object may be displayed in an area adjoining to the icon 30.

Next, referring to FIGS. 7 to 9, a multiple mode entering method according to an embodiment of the present invention will be described.

Figure 7:
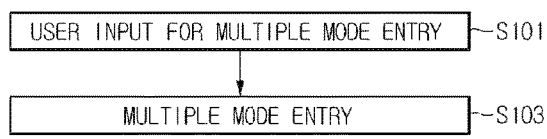
FIG. 7 is a flowchart illustrating a multiple mode entering method according to an embodiment of the present invention.

FIG. 7 is a flowchart illustrating a multiple mode entering method according to an embodiment of the present invention.

Referring to FIG. 7, when the control unit 180 detects a user input for entering a multiple mode that the user input unit 130 receives in operation S101, it enters a multiple mode in operation S103. Next, referring to FIGS. 8 and 9, a user input for a multiple mode entry according to an embodiment of the present invention will be described.

Figure 8:
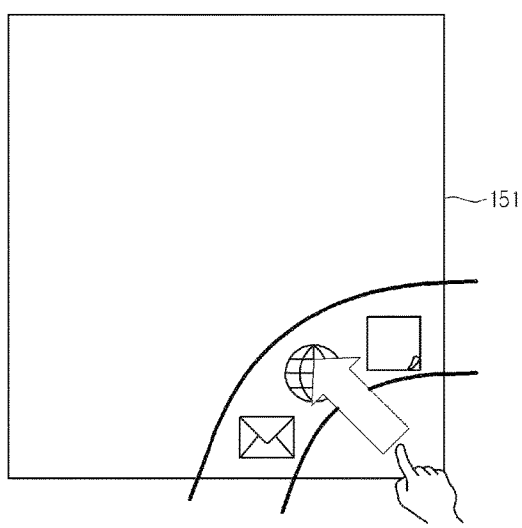
FIG. 8 is a view of a multiple mode entry command according to an embodiment of the present invention.

FIG. 8 is a view of a multiple mode entry command according to an embodiment of the present invention.

Referring to FIG. 8, the control unit 180 may detect a user input corresponding to a multiple mode entry command in the edge area of a touch screen.

The edge area of the touch screen where the multiple mode entry command is detected may mean a corresponding area from the edge of the touch screen toward the center thereof. A predetermined area may vary according to a user input, but is not limited thereto.

At this point, the edge area of the touch screen where a multiple mode entry command is detected may mean the edge area of a predetermined position. Moreover, the edge area of a predetermined position may mean a portion of the edge area of the touch screen. For example, as shown in FIG. 8, the control unit 180 may enter a multiple mode only when a user input is detected at the edge of the bottom right of the touch screen. Moreover, the edge area of a predetermined position may mean the entire edge area of the touch screen.

A user input corresponding to a multiple mode entry command may include touch and drag. A touch input included in a multiple mode entry command may mean a touch input for the edge area of the touch screen. Additionally, a drag input included in a multiple mode entry command may mean a drag input moving toward the center of the touch screen while a touch input for the edge area of the touch screen is maintained.

The control unit 180, which detects a multiple mode entry command, enters a multiple mode and then outputs a display component of a multiple mode to the display unit 151. At this point, the control unit 180 may output a display component of a multiple mode to the same position at which a user input is detected. For example, as shown in FIG. 8, the control unit 180 may output a display component of a multiple mode to the position where touch and drag is completed. At this point, a display component of a multiple mode may be diagonally displayed at the edge of the touch screen.

At this point, a display component of a multiple mode may be gradually displayed from the edge of the touch screen as touch and drag corresponding to a multiple mode entry command progresses. That is, a display component of a multiple mode may be gradually enlarged as touch and drag progresses. Additionally, a display component of a multiple mode may change the displayed position according to a touch screen position where a drag input is detected.

Figure 9:
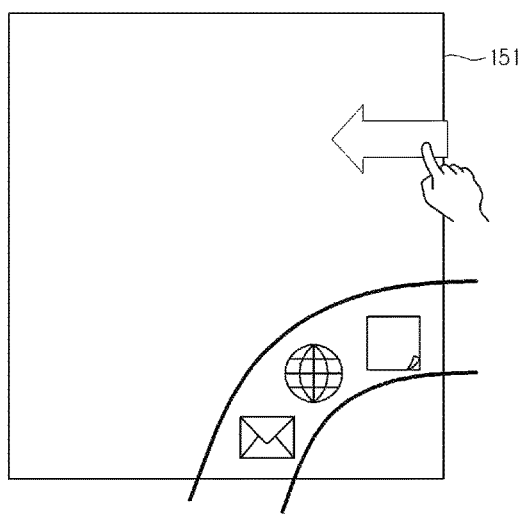
FIG. 9 is a view of a multiple mode entry command according to another embodiment of the present invention.

FIG. 9 is a view of a multiple mode entry command according to another embodiment of the present invention.

Referring to FIG. 9, the control unit 180 may output a display component of a multiple mode to a position different from a position at which a user input corresponding to a multiple mode entry command is detected.

For example, when a touch and drag input is detected at the right edge area of the touch screen, the control unit 180 enters a multiple mode, and then, as shown in FIG. 9, diagonally outputs a display component of a multiple mode at the edge of the bottom right of the touch screen.

At this point, the right edge area of the touch screen where a user input corresponding to a multiple mode entry command is detected may be the edge area of a predetermined position, and the position where a display component of a multiple mode may be fixed. However, the present invention is not limited thereto.

Next, referring to FIGS. 10 to 12, a multiple mode exiting method according to an embodiment of the present invention will be described.

Figure 10:
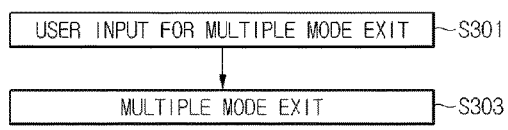
FIG. 10 is a flowchart illustrating a multiple mode exiting method according to an embodiment of the present invention.

FIG. 10 is a flowchart illustrating a multiple mode exiting method according to an embodiment of the present invention.

Referring to FIG. 10, when the control unit 180 detects a user input for exiting a multiple mode that the user input unit 130 receives in operation S301, it enters a multiple mode in operation S303. Next, referring to FIGS. 11 and 12, a user input for a multiple mode exit according to an embodiment of the present invention will be described.

Figure 11:
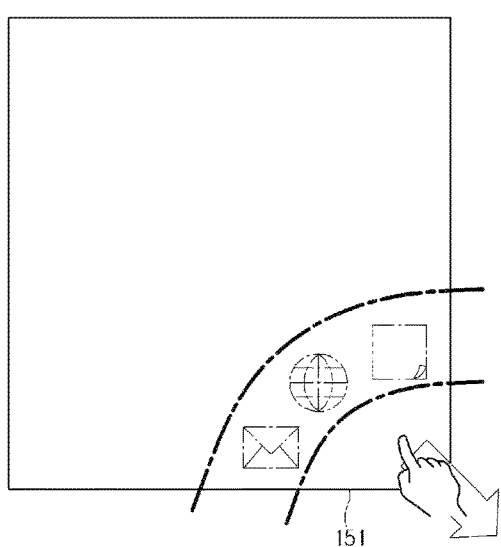
FIG. 11 is a view of a multiple mode exit command according to an embodiment of the present invention.

FIG. 11 is a view of a multiple mode exit command according to an embodiment of the present invention.

Referring to FIG. 11, the control unit 180 may detect a user input corresponding to a multiple mode exit command in the edge area of a touch screen.

The edge area of the touch screen where the multiple mode exit command is detected may mean a corresponding area from the edge of the touch screen toward the center thereof. The edge area of the touch screen where the multiple mode exit command is detected may be identical to that where the multiple mode entry command is detected, but is not limited thereto.

At this point, the edge area of the touch screen where a multiple mode exit command is detected may mean the edge area of a predetermined position. Moreover, the edge area of a predetermined position may mean a portion of the edge area of the touch screen. For example, as shown in FIG. 11, the control unit 180 may exit a multiple mode only when a user input is detected at the edge of the bottom right of the touch screen, i.e. the position identical to that where a display component of a multiple mode is outputted. Moreover, the edge area of a predetermined position may mean the entire edge area of the touch screen.

A user input corresponding to a multiple mode exit command may include touch and drag. A touch input included in a multiple mode exit command may mean a touch input for the edge area of the touch screen or a display component of a multiple mode. Additionally, a drag input included in a multiple mode exit command may mean a drag input moving toward the edge of the touch screen while a touch input for the edge area of the touch screen or a display component of a multiple mode is maintained. That is, a touch and drag direction corresponding to a multiple mode exit command may be opposite to that corresponding to a multiple mode entry command, but is not limited thereto.

The control unit 180, which detects a multiple mode exit command, exits a multiple mode and then stops outputting a display component of a multiple mode. At this point, a display component of a multiple mode may gradually disappear from the edge of the touch screen as touch and drag corresponding to a multiple mode exit command progresses.

That is, a display component of a multiple mode may be gradually diminished as touch and drag progresses.

Additionally, a display component of a multiple mode may change the displayed position according to a touch screen position where a drag input is detected. Finally, once touch and drag corresponding to a multiple mode exit command is terminated, a display component of a multiple mode is no longer displayed on the touch screen.

Figure 12:
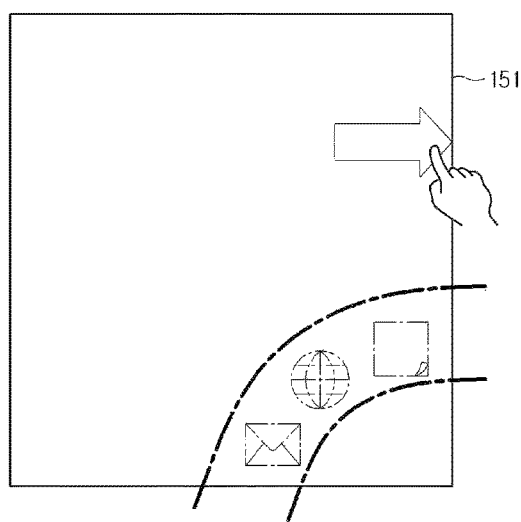
FIG. 12 is a view of a multiple mode exit command according to another embodiment of the present invention.

FIG. 12 is a view of a multiple mode exit command according to another embodiment of the present invention.

Referring to FIG. 12, the control unit 180 may detect a user input corresponding to a multiple mode exit command at a position different from that where a display component of a multiple mode is outputted.

For example, once a touch and drag input is detected in the right edge area of the touch screen where a display component of a multiple mode is displayed, the control unit 180 may stop displaying a display component of a multiple mode after the exit of the multiple mode.

At this point, the right edge area of the touch screen where a user input corresponding to a multiple mode exit command is detected may be the edge area of a predetermined position, but is not limited thereto.

Next, referring to FIGS. 13 and 14, a multiple mode display changing method according to an embodiment of the present invention will be described.

Figure 13:
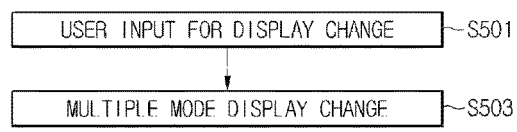
FIG. 13 is a flowchart illustrating a multiple mode display changing method according to an embodiment of the present invention.

FIG. 13 is a flowchart illustrating a multiple mode display changing method according to an embodiment of the present invention.

Referring to FIG. 13, when the control unit 180 detects a user input for changing a display that the user input unit 130 receives in operation S501, it changes a multiple mode display in operation S503. A multiple mode display change may mean a change of an area including the icons described with reference to FIG. 4. Next, referring to FIG. 14, a user input for a multiple mode display change according to an embodiment of the present invention will be described.

Figure 14:
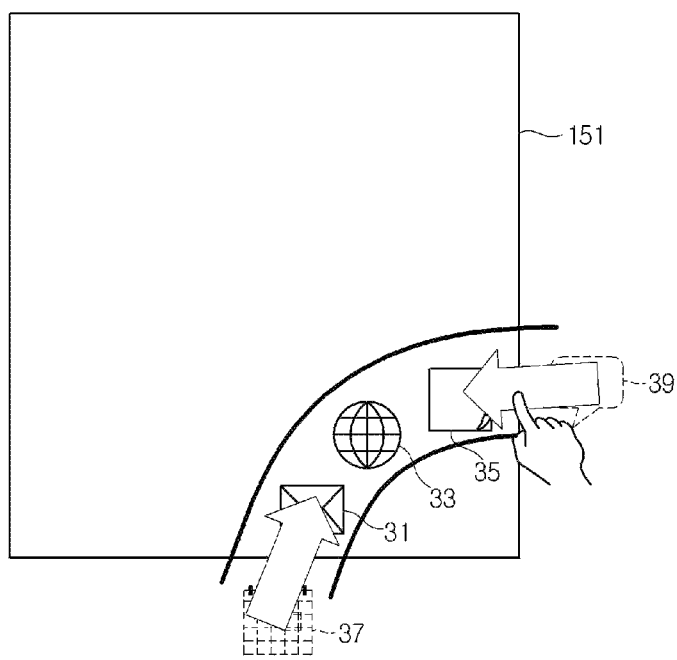
FIG. 14 is a view of a multiple mode change command according to an embodiment of the present invention.

FIG. 14 is a view of a multiple mode change command according to an embodiment of the present invention.

The multiple mode display change command may mean a command for changing the positions of the deactivated icons 37 and 39 in the inactivation area of the viewer area 10 into the activation area, or a command for changing the positions of the activated icons 31, 33, and 35 in the activation area into the inactivation area. At this point, the multiple mode display change command may include flicking according to the shape of the viewer area 10.

Referring to FIG. 14, the control unit 180 may detect flicking that rotates along the curve of the viewer area 10 on the viewer area 10 having a curved bar shape and then may change a multiple mode display.

For example, when the control unit 180 detects flicking that rotates from the right to the left, it may display the fifth icon 39 of the inactivation area on an area where the third icon 35 is positioned among the activation areas. At this point, as the fifth icon 39 is displayed at the position of the third icon 35, the third icon 35 and the second icon 33 may be respectively displayed in areas where the second icon 33 and the first icon 31 are positioned. Also, the first icon 31 moves to the inactivation area so that it may not be displayed on the display unit 151.

Additionally, when the control unit 180 detects flicking that rotates from the left to the right, it may display the fourth icon 37 of the inactivation area on an area where the first icon 31 is positioned among the activation areas. At this point, as the fourth icon 37 is displayed at the position of the first icon 31, the first icon 31 and the second icon 33 may be respectively displayed in areas where the second icon 33 and the third icon 35 are positioned. Also, the third icon 35 moves to the inactivation area so that it may not be displayed on the display unit 151.

That is, as flicking that rotates from the right to the left is detected, the control unit 180 may move each position of a plurality of icons in the viewer area 10 to the counterclockwise direction. Or, as flicking that rotates from the left to the right is detected, the control unit 180 may move each position of a plurality of icons in the viewer area 10 to the clockwise direction. At this point, if the number of icons to be included in the activation area is predetermined, each icon included in the activation area and inactivation area of the viewer area 10 may be changed.

Additionally, although not shown in the drawings, the control unit 180 may detect flicking that rotates along the straight line of the viewer area 10 on the viewer area 10 having a straight bar shape and then may change a multiple mode display. However, the present invention is not limited thereto.

In such a manner, a display changeable multiple mode according to an embodiment of the present invention may provide a simpler graphic user interface.

Next, referring to FIGS. 15 and 16, a multiple mode preview according to an embodiment of the present invention will be described.

Figure 15:
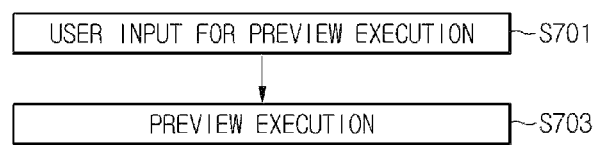
FIG. 15 is a flowchart illustrating a method of executing a preview of a copied object in a multiple mode according to an embodiment of the present invention.

FIG. 15 is a flowchart illustrating a method of executing a preview of a copied object in a multiple mode according to an embodiment of the present invention.

Referring to FIG. 15, when the control unit 180 detects a user input for preview execution that the user input unit 130 receives during multiple mode execution in operation S701, it executes a preview in operation S703. The preview of the multiple mode may mean a function for previewing the contents of an object before a copied and stored object is pasted. Next, referring to FIG. 16, a preview of a copied object according to an embodiment of the present invention will be described.

FIG. 16 is a view illustrating a preview execution command and preview screen of copied objects in a multiple mode according to an embodiment of the present invention.

Referring to FIG. 16 (A), when the control unit 180 receives a user input for selecting one icon of multiple mode display components displayed on the display unit 151, it may detect a preview execution command. A user input for selecting an icon may include touch or long touch for icons. A user input for selecting one icon may mean a preview execution command on an object corresponding to a selected icon. For example, as shown in FIG. 16 (A), a touch input for the third icon 35 may mean a preview execution command on an object copied from a memo application that the third icon 35 represents.

Referring to FIG. 16 (B), the control unit 180 may display a preview screen on the display unit 151 according to a preview execution command. For example, according to a touch input for the third icon 35, the control unit 180 may output on a preview screen 45 the information relating to an object that the third icon 35 represents.

The preview screen 45 may be displayed overlapping the top of a screen where the multiple mode of FIG. 16 (A) is executed, or may replace a screen, where a multiple mode is executed, and then, displayed. However, the present invention is not limited thereto. Additionally, the preview screen 45 may have a rectangle as shown in FIG. 16 (B), and is not limited thereto.

Object related information displayed on the preview screen 45 may include identification information 25 on an application from which an object is copied, information on the date and time at which an object is copied, contents 95 of an object, and an object number 55.

The identification information 25 on an application from which an object is copied may mean identification information on a memo application from which an object that the third icon 35 represents is copied and may include text information or image information. Text information for identifying a memo application may include the name of the memo application. Image information for identifying a memo application may include the icon of the memo application.

The information 75 on the date and time at which an object is copied, as mentioned above, may mean information on a time at which an object that the third icon 35 represents is copied and may include text information or image information. Text information on a time at which an object that the third icon 35 represents is copied from a memo application may include numbers and characters as shown in FIG. 16 (B). Image information on a time at which an object that the third icon 35 represents is copied from a memo application may include at least one of a calendar image and a clock image.

The contents 95 of an object may be displayed with larger fonts or bolder fonts than information relating to another object. Additionally, the whole or part of the contents 95 of an object may be displayed on the preview screen 45.

The object number 55 may be displayed on the internal area or edge area of the preview screen 45.

In such a manner, a multiple mode where a preview for a copied object is available according to an embodiment of the present invention may provide user-friendly interface to accurately select an object that a user intends.

Next, referring to FIGS. 17 and 18, a method of changing a preview screen of a multiple mode according to an embodiment of the present invention will be described.

FIG. 17 is a flowchart illustrating a method of changing a preview screen of a multiple mode according to an embodiment of the present invention.

Referring to FIG. 17, when the control unit 180 detects a user input for changing a screen that the user input unit 130 receives in operation S901, it changes a preview screen in operation S903.

One preview screen corresponds to one icon. Accordingly, once a plurality of objects are copied and stored and then a plurality of icons are generated, a plurality of preview screens respectively corresponding to a plurality of icons may be generated. However, if one preview screen is displayed on the display unit 151 during preview execution, a preview screen changing function may be provided in order to display another preview screen. A preview screen change may mean a change between preview screens generated from the same application, but is not limited thereto. Next, referring to FIG. 18, a preview screen change command of a multiple mode according to an embodiment of the present invention will be described.

Figure 18:
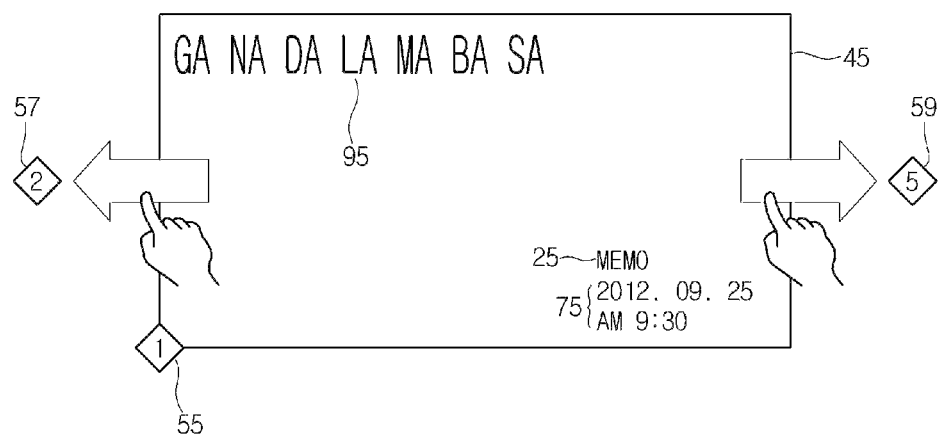
FIG. 18 is a view illustrating a preview screen change command of a multiple mode according to an embodiment of the present invention.

FIG. 18 is a view illustrating a preview screen change command of a multiple mode according to an embodiment of the present invention.

Referring to FIG. 18, the preview screen change command of a multiple mode may include left-oriented flicking or right-oriented flicking on a preview screen. The preview screen may include the object number of each object generated before/after a corresponding object is generated, in addition to the object number of the corresponding object. For example, as shown in FIG. 18, a third preview screen 45 may display a second object number 57 and a fourth object number 59 together in addition to a third object number 55.

Then, although not shown in the drawings, the control unit 180 may display on the display unit 151 a preview screen corresponding to the second object number 57 or a preview screen corresponding to the fourth object number 59 according to the left-oriented flicking. Additionally, the control unit 180 may display on the display unit 151 a preview screen corresponding to the second object number 57 or a preview screen corresponding to the fourth object number 59 according to the right-oriented flicking.

Next, referring to FIGS. 19 and 20, a method of changing a preview screen application of a multiple mode according to an embodiment of the present invention will be described.

Figure 19:
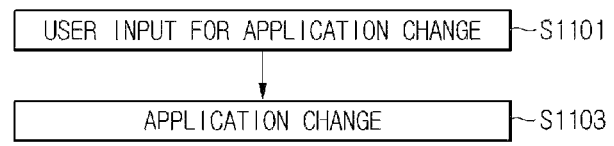
FIG. 19 is a flowchart illustrating a method of changing a preview application of a multiple mode according to an embodiment of the present invention.

FIG. 19 is a flowchart illustrating a method of changing a preview application of a multiple mode according to an embodiment of the present invention.

Referring to FIG. 19, when the control unit 180 detects a user input for changing an application that the user input unit 130 receives in operation S1101, it changes a preview application in operation S1103.

The preview application may mean an application from which an object corresponding to a preview screen is copied. In correspondence to a change between preview screens generated from the same application described with the above-mentioned embodiment, it is necessary to change the application itself from which a preview screen is generated. Next, referring to FIG. 20, a preview application change command of a multiple mode according to an embodiment of the present invention will be described.

Figure 20:
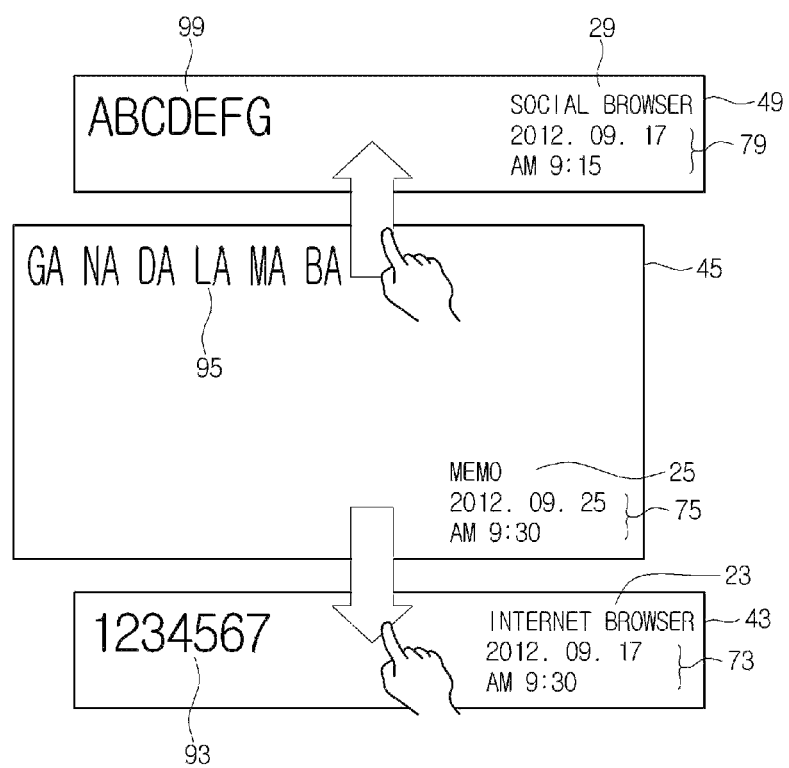
FIG. 20 is a view illustrating a preview application change command of a multiple mode according to an embodiment of the present invention.

FIG. 20 is a view illustrating a preview application change command of a multiple mode according to an embodiment of the present invention.

Referring to FIG. 20, the preview application change command of a multiple mode may include upward flicking or downward flicking on a preview screen.

The control unit 180 may output on the display unit 151 a fifth preview screen 49 corresponding to a fifth icon according to upward flicking. Additionally, the control unit 180 may output on the display unit 151 a second preview screen 43 corresponding to a second icon 33 according to downward flicking.

The second preview screen 43 may include second object related information such as identification information 23 on an internet explore application from which the second object is copied, information 73 on the date and time at which the second object is copied, and contents 93 of the second object.

In such a manner, the fifth preview screen 49 may include fifth object related information such as identification information 29 on an internet explore application from which the fifth object is copied, information 79 on the date and time at which the fifth object is copied, and contents 99 of the second object.

Next, referring to FIGS. 21 and 22, a method of editing a preview screen of a multiple mode according to an embodiment of the present invention will be described.

Figure 21:
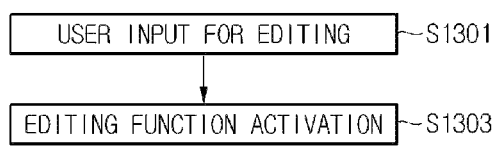
FIG. 21 is a flowchart illustrating a method of editing a preview screen of a multiple mode according to an embodiment of the present invention.

FIG. 21 is a flowchart illustrating a method of editing a preview screen of a multiple mode according to an embodiment of the present invention.

Referring to FIG. 21, when the control unit 180 detects a user input for editing a preview that the user input unit 130 receives in operation S1301, it activates a preview editing function in operation S1303. Although not shown in the drawings, a user input for preview editing may include touch or long touch input on the preview screen 45. However, a user input for preview editing is enough if it is distinguished from a user input for paste execution. Next, referring to FIG. 22, a preview editing function of a multiple mode according to an embodiment of the present invention will be described.

Figure 22:
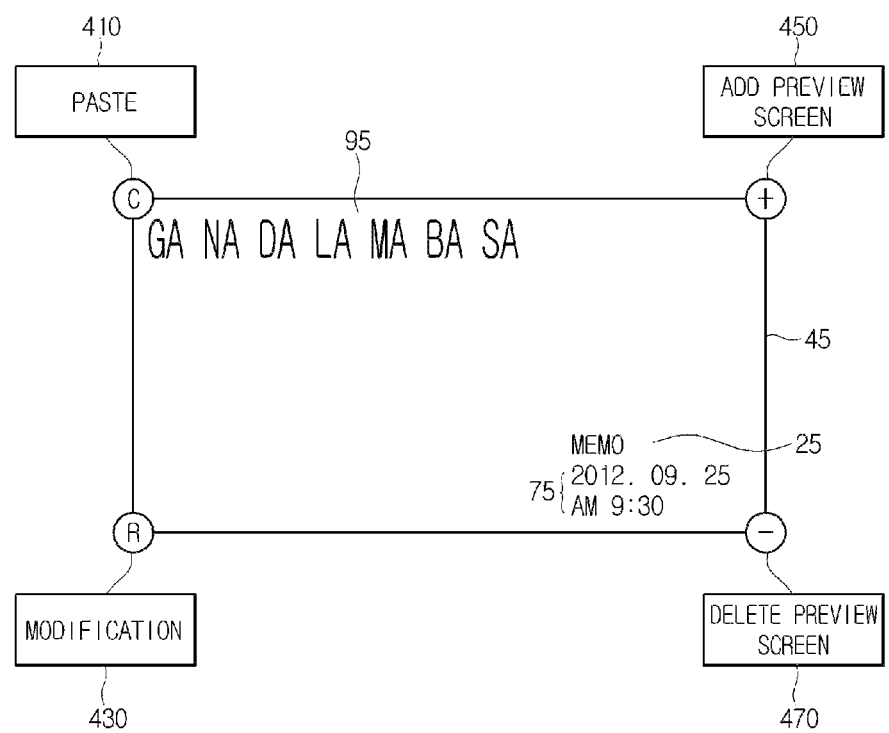
FIG. 22 is a view illustrating a preview screen for editing a multiple mode according to an embodiment of the present invention.

FIG. 22 is a view illustrating a preview screen for editing a multiple mode according to an embodiment of the present invention.

Referring to FIG. 22, once a preview editing function is activated, the control unit 180 may display a paste icon 410, an modification icon 430, a preview screen add icon 450, and a preview screen delete icon 470 at adjoining areas of the preview screen 45, but the present invention is not limited thereto.

The paste icon 410 may be selected to paste the contents 95 of the third object displayed on the third preview screen 45.

The modification icon 430 may be selected to edit the contents 95 of the third object displayed on the third preview screen 45. When the modification icon 430 is selected, an indicator such as a cursor that indicates the contents 95 of the third object may be displayed on the third preview screen 45, and an editing tool such as a keyboard may be activated.

The preview screen add icon 450 may be selected to insert a new object by adding a new page on the third preview screen 45.

The preview screen delete icon 470 may be selected to delete the third preview screen 45.

Next, referring to FIGS. 23 and 24, a method of moving a copied object from a preview screen of a multiple mode to its original position according to an embodiment of the present invention will be described.

Figure 23:
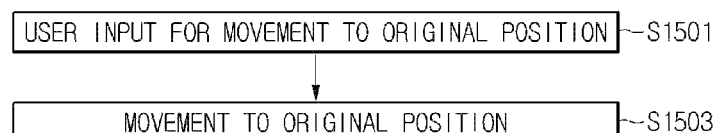
FIG. 23 is a flowchart illustrating a method of moving a copied object to its original position according to an embodiment of the present invention.

FIG. 23 is a flowchart illustrating a method of moving a copied object to its original position according to an embodiment of the present invention.

Referring to FIG. 23, when the control unit 180 detects a user input for moving an object to its original position that the user input unit 130 receives in operation S1501, it moves a corresponding object to its original position in operation S1503.

The original position of the corresponding object may mean the position, where the original icon is stored, on an application from which a corresponding object is copied. The control unit 180 may move a corresponding object to its original position using URL, i.e. the original position of the corresponding object. When the corresponding object moves to its original position, the control unit 180 may display the original of the corresponding object on the display unit 151. Next, referring to FIG. 24, an original position move command according to an embodiment of the present invention will be described.

Figure 24:
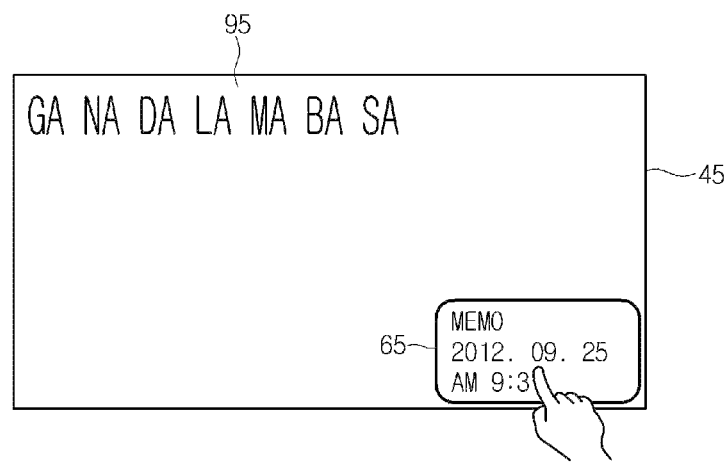
FIG. 24 is a view of an original position move command according to an embodiment of the present invention.

FIG. 24 is a view of an original position move command according to an embodiment of the present invention.

Referring to FIG. 24, the control unit 180 receives a user input for selecting an original position indicator 65 included in the third preview screen 45, it may detect the original position move command.

The original position indicator 65 may execute an original position URL link function, and may be displayed as an additional user interface. Or, as shown in FIG. 24, the original position indicator 65 may be displayed as a user interface including identification information on an application from which a third object displayed in the existing third preview screen 45 is copied and information on the date and time at which the third object is copied.

A user input for moving an object to its original position may mean a user input for selecting the original position indicator 65. For example, a user input for moving an object to its original position may include touch input or long touch input for the original position indicator 65.

Next, referring to FIGS. 25 and 26, a method of pasting a copied object using a multiple mode according to an embodiment of the present invention will be described.

Figure 25:
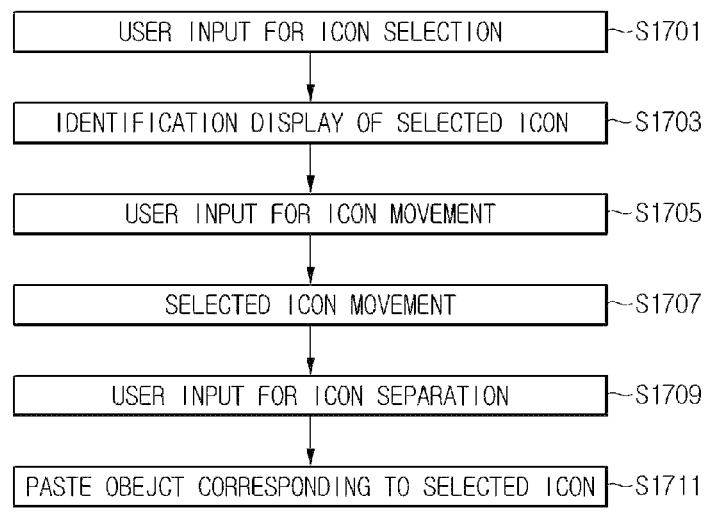
FIG. 25 is a flowchart illustrating a method of pasting a copied object using a multi mode according to an embodiment of the present invention.

FIG. 25 is a flowchart illustrating a method of pasting a copied object using a multi mode according to an embodiment of the present invention.

Referring to FIG. 25, when the control unit 180 detects a user input for selecting an icon on a multiple mode in operation S1701, it performs an identification display of the selected icon in operation S1703.

A user input for selecting an icon may mean a user input for selecting one of a plurality of icons displayed on the display unit 151.

An identification display of a selected icon may mean distinguishingly displaying selected icons and unselected icons. For example, the unselected icons may be displayed only at the fixed position of the viewer area 10, but the selected icons may be displayed at any position of the display unit 151 including the viewer area 10. Next, a user input for selecting an icon will be described with reference to FIG. 26.

Figure 26:
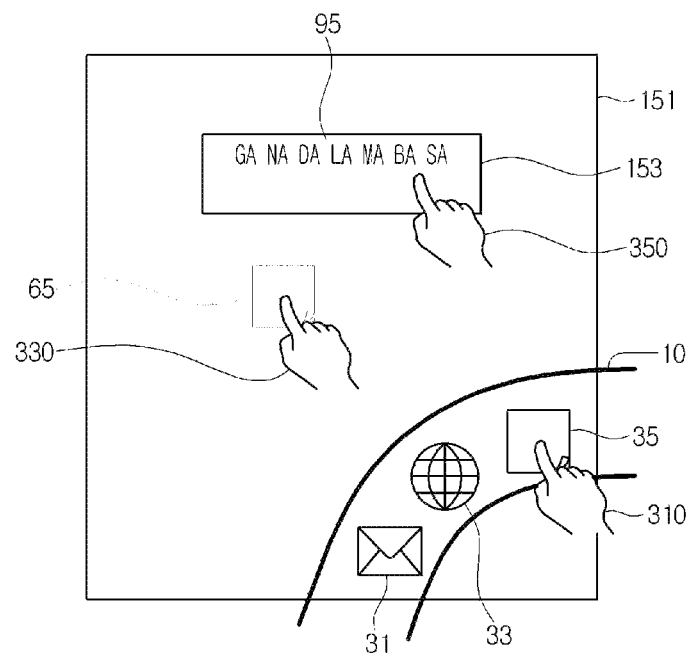
FIG. 26 is a view of a copied object paste command using a multiple mode according to an embodiment of the present invention.

FIG. 26 is a view of a copied object paste command using a multiple mode according to an embodiment of the present invention.

Referring to FIG. 26, a user input 310 for selecting an icon may include touch input or long touch input for one icon. For example, the user input 310 for selecting an icon may include touch input or long touch input for a third icon 35.

Again, FIG. 25 will be described.

Next, when the control unit 180 detects a user input for moving an icon in operation S1705, it displays a moving path of a selected icon on the display unit 151 in operation S1707.

The user input for moving an icon may mean a user input for moving an icon, which is selected from on a multiple mode, from the viewer area 10 to a user input window, in order to paste an object that the selected icon represents on a user input window displayed on the display unit 151.

A moving path of the selected icon may mean a current path through which a selected icon moves according to a user input.

Referring to FIG. 26, in relation to the user input 330 for moving an icon, touch input or long touch input for the third icon 35 may be drag input that is maintained from the viewer area 10 to the user input window 153.

Additionally, the selected third icon 65 on a moving path may be dimmed.

Again, FIG. 25 will be described.

Next, when the control unit 180 detects a user input for separating an icon in operation S1709, it pastes an object corresponding to the selected icon on a user input window in operation S1711.

A user input for separating an icon may mean a user input that is stopped for the icon movement described in operation S1705.

Once a user input for icon separation is detected, the control unit 180 may paste contents of an object corresponding to a separated icon on the position where the user input for icon separation of the display unit 151 is detected.

Referring to FIG. 26, the user input 350 for icon separation may user input that stops drag input for the third icon 35. When the user input 350 for separating the third icon 35 on the user input window 153 is detected, the object contents corresponding to the third icon 35, i.e. ga na da ra ma ba sa, may be inputted in the user input window 153.

In such a manner, an icon corresponding to a paste completed object may be deleted from a multiple mode display component, and may be maintained regardless of paste execution, until an additional delete command is detected.

Next, referring to FIGS. 27 and 28, a copy event processing process in a multiple mode according to an embodiment of the present invention will be described.

Figure 27:
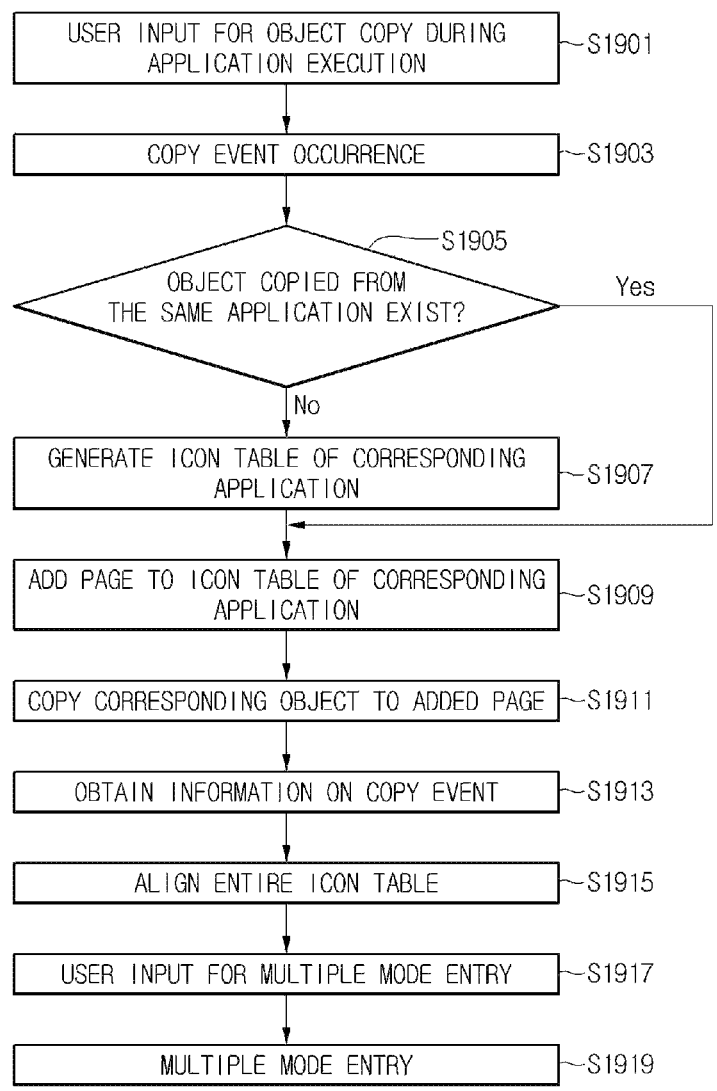
FIG. 27 is a flowchart illustrating a method of copying and pasting a plurality of objects using a multiple mode according to an embodiment of the present invention.

FIG. 27 is a flowchart illustrating a method of copying and pasting a plurality of objects using a multiple mode according to an embodiment of the present invention.

Referring to FIG. 27, when the control unit 180 receives a user input for object copy during application execution in operation S1901, it detects copy event occurrence in operation S1903.

Then, the control unit 180 determines whether there is an object copied from the same application in operation S1905. The control unit 180 may perform operation S1905 on the basis of whether copy event occurrence is detected in the same application.

If there is no object copied from the same application, the control unit 180 newly generates an icon table of an application (which is executed in operation S1901) in operation S1907. If it is assumed that one copied object is copied into one page, the icon table of an application may mean the position where a plurality of pages generated in the application are sequentially stored.

On the contrary, if there is an object copied from the same application, the control unit 180 adds a newly generated page to the icon table of a corresponding application. If there is an object copied from the same application, without generating the icon table of a corresponding application again, it is enough to add a newly generated page to the icon table of a corresponding application.

Then, the control unit 180 copies to the page (added in operation S1909) an object (that the user input indicates in operation S) in operation S1911. At this point, the control unit 180 copies the contents of a corresponding object and stores it in corresponding page.

Additionally, the control unit 180 obtains information on a copy event (that occurs in operation S1903) in operation S1913. Information on a copy event may include information relating to an object corresponding to the copy event such as information on the date and time at which the object is copied or information on an application from which an object is copied.

When object related information including object contents is obtained, the control unit 180 may align the entire icon table in operation S1915. The control unit 180 may align an icon table by each application, and may align a corresponding icon table according to an order at which a corresponding application is copied and stored. Moreover, operation S1915 may be omitted.

Then, when a user input for multiple mode entry is detected in operation S1917, the control unit 180 enters the above-mentioned multiple mode in operation S1919. In such a manner, according to an embodiment of the present invention, user convenience may be provided by copying and storing each of a plurality of objects and then aligning and providing them in a multiple mode.

Figure 28:
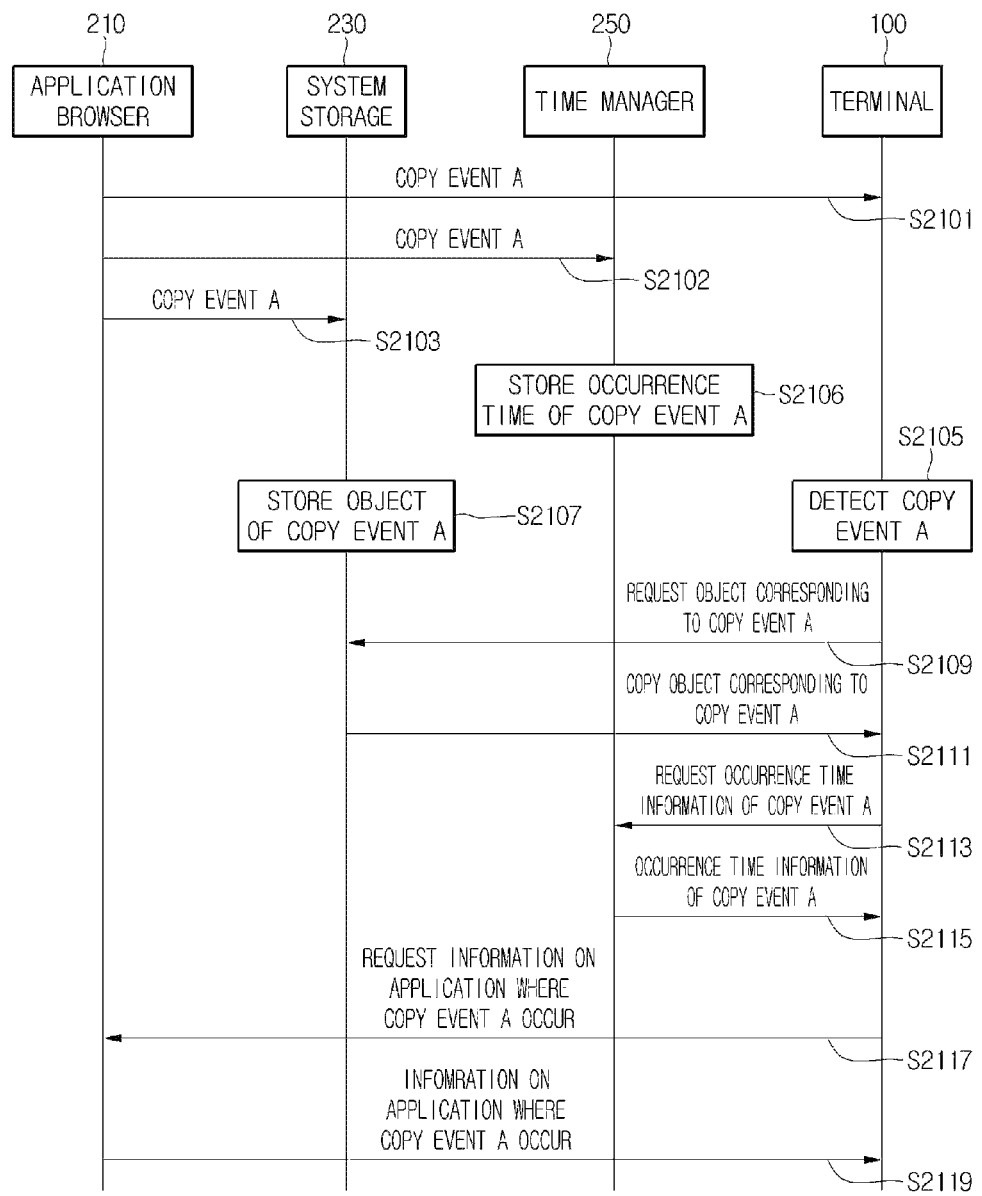
FIG. 28 is a flowchart illustrating a method of copying and storing a plurality of objects in a multiple mode according to an embodiment of the present invention.

FIG. 28 is a flowchart illustrating a method of copying and storing a plurality of objects in a multiple mode according to an embodiment of the present invention.

Referring to FIG. 28, once a user input for object copy during corresponding application execution is received, an application browser 210 generates a copy event A and then, transmits it to a terminal 100, a system storage 230, and a time manager 250 in operations S2101, S2103, and S2102. The application browser 210, the system storage 230, the time manager 250, and the terminal 100 may mean a multiple mode execution system according to an embodiment of the present invention.

The terminal 100 receives the copy event A transmitted from the application browser 210 and detects the copy event A in operation S2106.

The time manager 250 receives the copy event A transmitted from the application browser 210 and stores a time that the copy event A occurs in operation S2106.

Additionally, the system storage 230 receives the copy event A transmitted from the application browser 210 and stores an object corresponding to the copy event A in operation S2107.

Then, the control unit 180 of the terminal 100 requests an object corresponding to the copy event A stored in the system storage 230 in operation S2109 in correspondence to the detection of the copy event A. The system storage 230 receives the request of operation S2109 and copies the objects corresponding to the copy event A (stored in operation S2107) to the terminal 100 in operation S2111.

Additionally, the control unit 180 of the terminal 100 requests information on an occurrence time of the copy event A to the time manager 250 in correspondence to the detection of the copy event A in operation S2113. The system manager 250 receives the request of operation S2113 and transmits information on a time at the copy event A occurs (stored in operation S2106) to the terminal 100 in operation S2115.

Additionally, the control unit 180 of the terminal 100 requests information on an application where the copy event A occurs to the application browser 210 in correspondence to the detection of the copy event A in operation S2117. The application browser 210 receives the request of operation S2117 and transmits the information on an application where the copy event A occurs, for example, identification information on the application browser 210, to the terminal 100 in operation S2119.

Next, referring to FIGS. 29 and 30, a method of deleting a copy object in a multiple mode according to an embodiment of the present invention will be described.

Figure 29:
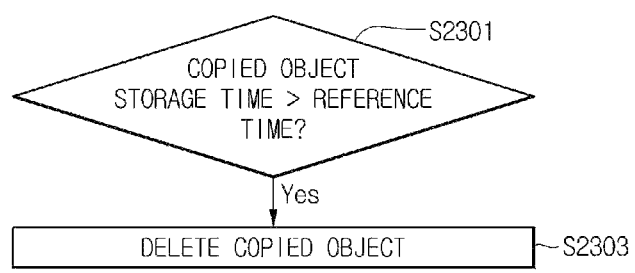
FIG. 29 is a flowchart illustrating a method of deleting a plurality of objects in a multiple mode according to an embodiment of the present invention.

FIG. 29 is a flowchart illustrating a method of deleting a plurality of objects in a multiple mode according to an embodiment of the present invention.

Referring to FIG. 29, the control unit 180 compares a copied object storage time with a reference time in operation S2301.

The copied object storage time may mean an elapsed time after each of a plurality of objects is copied and stored. For example, an elapsed time after a corresponding object is copied to a page added to the icon table described with reference to FIG. 27 may be included in the copied object storage time.

The reference time may be predetermined or may vary according to a user input.

Then, when the copied object storage time exceeds the reference time, the control unit 180 deletes the copied object in operation S2303. When a plurality of objects are copied and stored, the control unit 180 compares the copy and storage time of each of a plurality of objects with the reference time, and then deletes only an object whose storage time exceeds the reference time.

Figure 30:
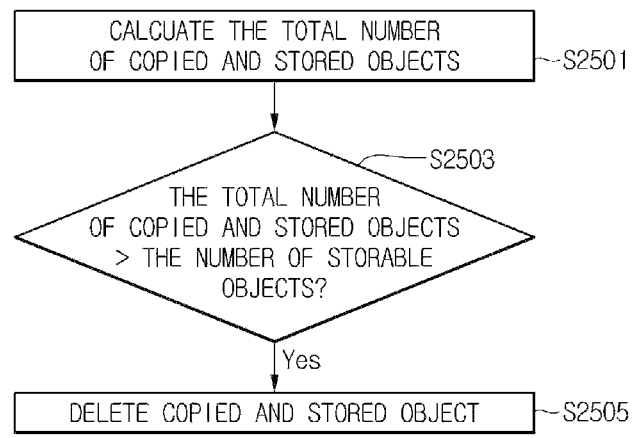
FIG. 30 is a flowchart illustrating a method of deleting a plurality of objects in a multiple mode according to another embodiment of the present invention.

FIG. 30 is a flowchart illustrating a method of deleting a plurality of objects in a multiple mode according to another embodiment of the present invention.

Referring to FIG. 30, the control unit 180 calculates the total number of copied and stored objects in operation S2501, and then compares the total number with the number of objects that can be stored in operation S2503.

The total number of copied and stored objects may mean the total number of objects copied and stored in one application, or the total number of objects coped and stored in the entire applications. But, the present invention is not limited thereto. For example, the number of pages added to the entire icon table described with reference to FIG. 27, or the number of pages added to the icon table of one application may be included in the total number of copied and stored objects.

The number of objects that can be stored may mean the number of pages that can be added to the entire icon table described with reference to FIG. 27, or the number of pages that can be added to the icon table of one application. Additionally, the number of objects that can be stored may be predetermined or may vary according to a user input.

The control unit 180 may calculate the total number of copied and stored objects at each predetermined time to compare the total number with the number of objects that can be stored. Or, the control unit 180 may calculate the total number of copied and stored objects each time a copy event occurs to compare the total number with the number of objects that can be stored.

Then, when the total number of copied and stored objects exceeds the number of objects that can be stored, the control unit 180 deletes the copied and stored object in operation S2505. For example, the control unit 180 may delete an object that is copied and stored first among the plurality of copied and stored objects. Or, once a copy event occurs, when the total number of copied and stored objects exceeds the number of objects that can be stored, the control unit 180 may not store an object corresponding to a copy event, or may delete an object that is copied and stored right before a copy event occurs.

Additionally, although not shown in the drawings, the control unit 180 may delete a copied and stored object according to a user input.

According to embodiments of the present invention, after a plurality of objects are copied and stored, provided is a list of the plurality of copied objects in order to select and paste an object that a user wants.

Examples of the computer readable recording medium include read-only memory (ROM), random-access memory (RAM), CD-ROMs, magnetic tapes, floppy disks, and optical data storage devices, and also include carrier waves (such as data transmission through the Internet).

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A terminal comprising:
   memory;
   a display configured to display a content and detect a user input; and
   a processor configured to:
   copy an object included in the content and store the copied object in accordance with a user copy input,
   when a plurality of objects are copied in accordance with the user copy input being received multiple times, display a plurality of icons that respectively represent the plurality of objects on the display according to a first user input,
   display, on the display, a preview screen including information relating to a first object that a first icon represents, when a user input to select the first icon among the plurality of icons is received, display, on the display, a preview screen including information relating to a second object that a second icon represents according to a preview screen change command, wherein the information relating to the second object comprises a text included in the second object, modify the text included in the second object when a user input to modify contents of the second object is received, display at least one icon to be identified according to a second user input that selects the at least one icon from the plurality of icons, paste the object corresponding to the selected icon on an input window according to a third user input that inputs the selected at least one icon into the input window, and delete some of the plurality of objects when a total number of the copied objects exceeds a number of copy available objects.

2. The terminal according to claim 1, wherein the first user input is detected from an edge area of the display.

3. The terminal according to claim 1, wherein the first user input comprises a touch and drag detected in a direction from an edge area of the display to a center of the display.

4. The terminal according to claim 1, wherein the processor is further configured to display a shape of each of the plurality of icons as an application from which each of the plurality of objects is copied.

5. The terminal according to claim 1, wherein the processor is further configured to display each of the plurality of icons together with an object number representing an order in which each of the plurality of objects is copied.

6. The terminal according to claim 5, wherein the processor is further configured to sequentially display each of the plurality of icons according to the object number.

7. The terminal according to claim 1, wherein the processor is further configured to display the plurality of icons sequentially in a bar-shaped viewer area.

8. The terminal according to claim 7, wherein the viewer area comprises an activation area displayed on the display and an inactivation area not displayed on the display, and
wherein the processor is further configured to move a first icon in the activation area to the inactivation area according to a fourth user input and move a second icon in the inactivation area to the activation area in correspondence to the fourth user input.

9. The terminal according to claim 1, wherein the processor is further configured to display a date and time at which each of the plurality of objects is copied, in an icon area of each of the plurality of icons.

10. The terminal according to claim 1, wherein the processor is further configured to display an entire or part of contents of each of the plurality of objects, in an icon area of each of the plurality of icons.

11. The terminal according to claim 1, wherein the display unit is further configure to detect a fourth user input detected in a direction toward an edge area,
wherein the processor is further configured to stop displaying the plurality of icons according to the fourth user input, and
wherein the fourth user input comprises a touch and drag.

12. The terminal according to claim 1, wherein the processor is further configured to display on the display information relating to the object that the selected at least one icon represents in correspondence to a fourth user input that selects at least one icon from the plurality of icons, and wherein the fourth user input corresponds to a user input distinguished from the second user input.

13. The terminal according to claim 12, wherein the object related information comprises at least one of contents of the object, identification information on an application from which the object is copied, a date and time at which the object is copied, or an order in which the object is copied.

14. The terminal according to claim 12, wherein the processor is further configured to display information relating to an object that an unselected icon represents, except for the at least one icon selected by the fourth user input, according to a fifth user input.

15. The terminal according to claim 12, wherein the processor is further configured to display on the display the object related information and an editing tool for modifying or deleting the object related information, and modify or delete the object related information according to a fifth user input that selects the editing tool.

16. The terminal according to claim 12, wherein the processor is further configured to display on the display an indicator representing an original position where the object is copied, and display a screen including an original from which the object is copied according to a fifth user input that selects the indicator.

17. The terminal according to claim 1, wherein the object included in the content further comprises an image.

18. A method of operating a terminal, the method comprising:
displaying a content;
copying an object included in the content and storing the copied object, in accordance with a user copy input;
when a plurality of objects are copied in accordance with the user copy input being received multiple times, displaying a plurality of icons that respectively represent the plurality of objects sequentially in a bar shaped viewer area according to a first user input;
displaying a preview screen including information relating to a first object that a first icon represents, when a user input to select the first icon among the plurality of icons is received;
displaying a preview screen including information relating to a second object that a second icon represents according to a preview screen change command, wherein the information relating to the second object comprises a text included in the second object;
modifying the text included in the second object when a user input to modify contents of the second object is received;
displaying at least one icon to be identified according to a second user input that selects the at least one icon from the plurality of icons;
pasting the object corresponding to the selected at least one icon on an input window according to a third user input that inputs the selected at least one icon into the input window, and
deleting some of the plurality of objects when a total number of the copied objects exceeds a number of copy available objects.

19. The method according to claim 18, wherein the viewer area comprises an activation area displayed on the display and an inactivation area not displayed on the display, and
wherein the method further comprises:
moving a first icon in the activation area to the inactivation area according to a fourth user input; and
moving a second icon in the inactivation area to the activation area in correspondence to the fourth user input.

20. The method according to claim 18, further comprising stopping displaying the plurality of icons according to a fourth user input, wherein the fourth user input comprises a touch and drag that is detected in a direction toward an edge area of the terminal.

* * * * *